United States Patent [19]

Harrison

[11] 4,008,816
[45] Feb. 22, 1977

[54] GRAIN BIN SWEEP AUGER WITH TORQUE ARM

[75] Inventor: Leonard E. Harrison, Clay Center, Kans.

[73] Assignee: Royal Industries, Inc., Pasadena, Calif.

[22] Filed: May 16, 1975

[21] Appl. No.: 578,271

[52] U.S. Cl. .................. 214/17 DA; 259/40
[51] Int. Cl.² ................................ B65G 65/30
[58] Field of Search ... 222/236, 242, 233, 410–414; 259/40; 198/213, 64; 214/17 DA, 17 DB

[56] References Cited
UNITED STATES PATENTS

| | | | |
|---|---|---|---|
| 2,711,814 | 6/1955 | McCarthy | 214/17 DA |
| 3,237,788 | 3/1966 | Weaver et al. | 214/17 DA |
| 3,289,863 | 12/1966 | Buschbom | 214/17 DB |
| 3,367,519 | 2/1968 | Ferris et al. | 214/17 DA |
| 3,449,840 | 6/1969 | Francis | 214/17 DA |
| 3,486,643 | 12/1969 | Smith | 214/17 DA |
| R26,072 | 8/1966 | Sime | 214/17 DB |

Primary Examiner—Robert B. Reeves
Assistant Examiner—H. Grant Skaggs
Attorney, Agent, or Firm—Edward J. DaRin

[57] ABSTRACT

A grain storage bin has a floor with a central discharge opening, an elongated sweep auger extending radially from the discharge opening toward the wall of the bin, and an elongated shield extending alongside the auger. The sweep auger and shield travel as a unit around the interior of the bin to channel grain toward the discharge opening as the auger is being rotated about its axis. An elongated torque arm attached in a fixed position alongside the shield provides torsional reinforcing for the shield and longitudinal reinforcing for preventing the auger and shield from sagging mid-span.

12 Claims, 4 Drawing Figures

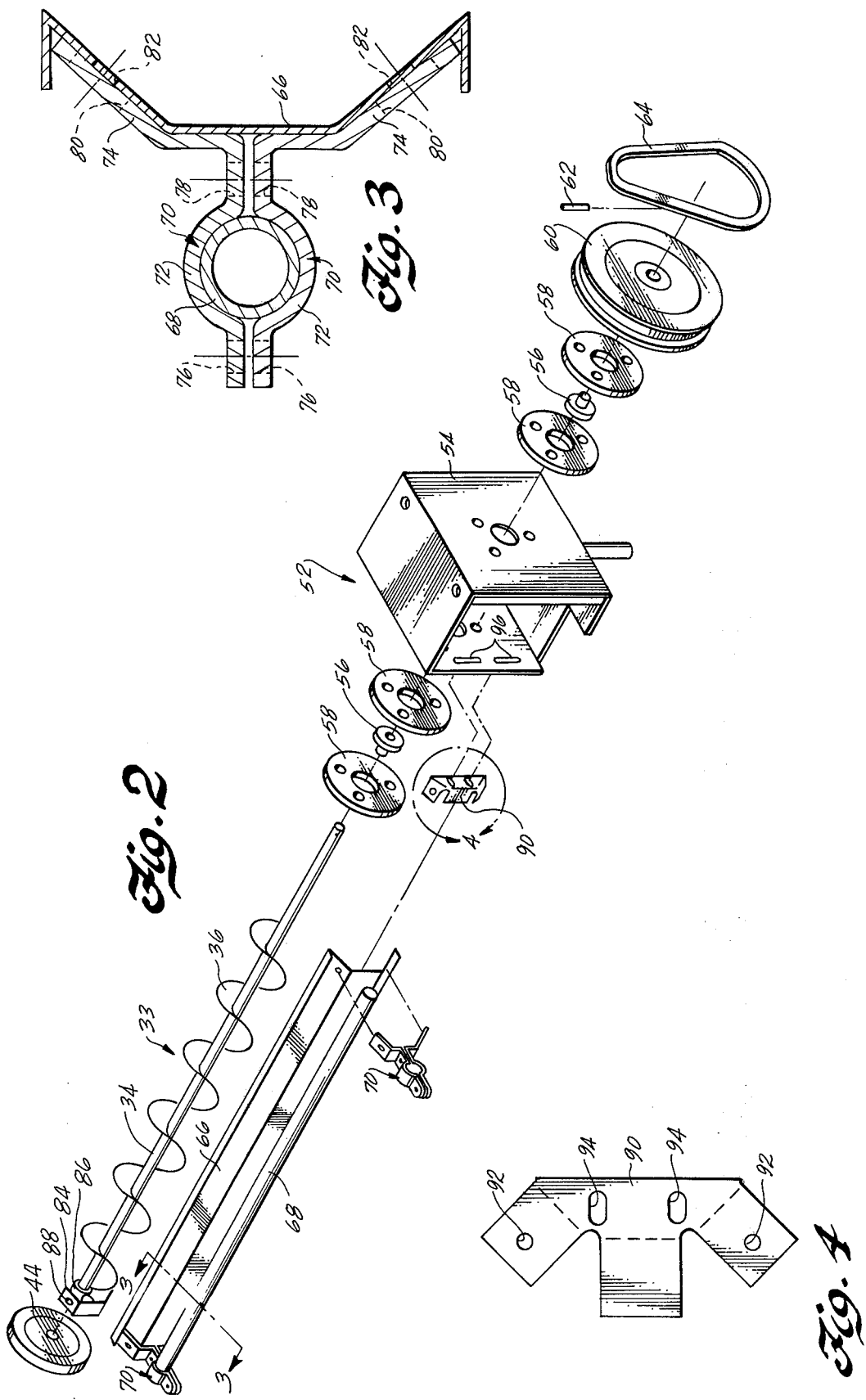

GRAIN BIN SWEEP AUGER WITH TORQUE ARM

BACKGROUND

This invention relates to grain storage bins, and more particularly to sweep augers for unloading grain from such storage bins.

"Sweep augers", which are the subject of this invention, are used to unload grain from grain storage bins which are of upright, generally cylindrical construction. These grain storage bins have a floor with a central discharge opening. All grain which is stored in the bin is removed from the bin through the discharge opening.

Grain bins of this kind generally use a horizontal "unloading auger" (which is different from a "sweep auger") to move the grain from the opening in the bin floor to a point outside the bin. Generally, the unloading auger is located under the bin floor, leaving the floor in the bin clear of any obstructions. The unloading auger is commonly mounted in a horizontal discharge pipe or sleeve. The inner end of the sleeve communicates with the discharge opening, and discharged grain is collected outside the bin when moved through the sleeve by rotating the unloading auger. Grain is removed from the bin by the unloading auger until all the grain that will flow naturally from the bin through the discharge opening is gone. The top surface of the grain remaining in the bin extends upwardly at an angle of about 30° to 35° (called the angle of repose) from the center opening in the bin floor to the bin wall in all directions from the center. In a large diameter storage bin the grain remaining is considerable and can represent thousands of bushels. The purpose of a sweep auger is to bring this remaining grain to the center opening of the bin where it can be removed by the unloading auger.

In some types of sweep auger drive units, the inner end of the auger is attached to a motor and drive unit located in the center discharge opening of the bin. The sweep auger is placed in the bin and connected to the drive unit after the initial grain has been removed to expose the center opening. In other types of sweep auger drive units, a motor for driving both the unloading auger and the sweep auger is located outside the bin. A power transfer unit in the central opening of the bin floor is connected to the unloading auger and to the sweep auger. The motor outside the bin provides the power for the sweep auger. The sweep auger is left in the bin at all times, rather than being connected to the drive unit only after the initial grain has been removed. The sweep auger is started by a clutch mechanism after all grain that will flow naturally has been removed by the unloading auger. In either drive unit, the sweep auger extends radially from the vicinity of the central discharge opening toward the bin wall and is slightly shorter in length than the bin radius.

The sweep auger is ordinarily used in combination with a long shield which extends parallel to and alongside the auger. Augers used with a shield have certain advantages, but many times a sweep auger is used without a shield. In either instance, the attachment between the sweep auger and the drive unit allows the sweep auger to rotate about its axis and also permits angular travel of the auger around the interior of the storage bin.

When the sweep auger is used without a shield, the auger rests on the grain surface as it rotates to pull the grain toward the center opening. As the auger rotates it travels through several revolutions around the bin and lowers the grain level uniformly throughout the bin. Usually there is a wheel on the bin wall end of the sweep auger which is slightly larger in diameter than the auger. The wheel contacts the bin floor when the auger finally reaches the vicinity of the floor to prevent the auger from scratching directly on the floor.

The more common sweep auger is equipped with a shield. The shield extends the full length of the auger, and is mounted on the side of the auger remote from the direction of travel of the auger around the bin. The height of the shield is usually about equal to the diameter of the sweep auger. The surface of the shield facing the auger is somewhat concave so as to conform to the round shape of the auger and is located about one inch from the auger. When the sweep auger and shield are placed in a bin they initially rest on the grain surface. When the sweep auger is rotated it will throw grain against the shield in the process of pulling grain toward the bin center. This causes the shield to hold back the auger and prevents it from traveling around the bin as does the sweep auger without a shield. As a result, the auger digs down into the pile of grain, following a downward path of about a 45° angle, until it reaches the vicinity of the floor. From that point on it continues to advance into the grain pile around the floor and empties the bin in one revolution of the sweep auger around the bin. The forward propulsion of the sweep auger comes from a wheel mounted on the bin wall end of the auger shaft. The wheel is usually about 1 inch to 1½ inches larger in diameter than the sweep auger. The contact of the spinning rubber wheel against the bin floor provides the forward travel of the sweep auger.

One advantage of using a shield is that it leaves the bin floor cleaner as it continually scrapes up grain thrown against it by the auger. The lower the shield can be adjusted to the floor, the better the cleaning job that will result. However, if the shield adjustment is too low, or if the shield or auger sags mid-span under its own weight, the forward travel of the auger will be stopped because of excessive drag on the bin floor. This latter problem is a serious one when a shield is not very resistant to torque.

Grain storage bins vary in diameters from about 15 to 60 feet, but in recent years larger storage bins having diameters of 75 feet and larger have been used. In most bins, but especially the larger diameter bins, the sweep auger tends to sag mid-span under its own weight. In units where a shield is used, the shield also tends to be flexible longitudinally and sags in the center. Moreover, shields are not strong torsionally and have a great tendency to twist about their longitudinal axes.

In the past, some shields have been reinforced by welding an elongated angle-iron to the shield to form a triangular cross-sectional structure having fairly good resistance to torsion. However, the present invention provides an improved sweep auger assembly having more stiffness longitudinally and torsionally than the prior art triangular structure, as well as an easier means for adjusting the height of the shield above the floor of the grain bin.

SUMMARY

This invention provides a sweep auger assembly which includes a rigid stiffening member secured alongside the auger for adding longitudinal stiffness to substantially prevent the auger from sagging under its own weight. In units where a shield is used, the stiffening member stiffens the shield to minimize sagging and also provides good resistance to the shield twisting about its axis.

Briefly, the invention includes an elongated sweep auger located within a grain storage bin having a flat bottom with a central grain discharge opening. The sweep auger extends radially from the vicinity of the discharge opening to the wall of the bin. The sweep auger is rotatable about its longitudinal axis and also travels angularly around the interior of the bin to pull grain toward the discharge opening. A rigid, elongated stiffening member is attached in a fixed position along the side of the sweep auger remote from its direction of angular travel. The stiffening member is spaced closely from the sweep auger along a substantial portion of the length thereof to provide longitudinal reinforcing for minimizing sagging of the auger under its own weight.

In a preferred form of the invention, an elongated shield extends generally parallel to the sweep auger along a substantial length of the auger and is secured in a fixed position spaced closely from the auger. The shield is mounted so that a generally concavely curved face of the shield faces the side of the auger remote from its direction of travel so that the shield cooperates with the rotating auger to channel grain toward the discharge opening. The stiffening member is mounted in a fixed position spaced closely from the side of the shield remote from the auger and is non-rotatable about its axis to provide longitudinal and torsional reinforcement for the shield in addition to providing longitudinal reinforcing for the sweep auger.

Thus, the stiffening member is especially useful in grain bins of large diameters in which the long sweep auger and shield are subject to sagging mid-span. In addition, the fixed stiffening member resists twisting of the shield which, because of its long length and relatively narrow cross-section, normally has low torsional strength.

In a preferred means for mounting the shield and stiffening member, a pair of fixed shield supports are located at opposite ends of the sweep auger. A pair of stiffening member support brackets hold opposite ends of the stiffening member and are engaged with opposite ends of the shield. The brackets are attached, along with the shield, to the fixed shield supports. The stiffening member and shield are rotatable as a unit relative to the shield supports for easily adjusting the vertical height of the shield and the stiffening member above the bin floor.

These and other aspects of the invention will be more fully understood by referring to the following detailed description and the accompanying drawings.

DRAWINGS

FIG. 2 is an exploded view showing the sweep auger and stiffening member assembly according to this invention used in a grain storage bin having a sweep auger drive unit which is different from that shown in FIG. 1;

FIG. 3 is a cross-sectional elevation view taken on line 3—3 of FIG. 2; and

FIG. 4 is a plan view of the shield mounting bracket in the circle 4 of FIG. 2 shown in flat form.

DESCRIPTION

Figure 1:
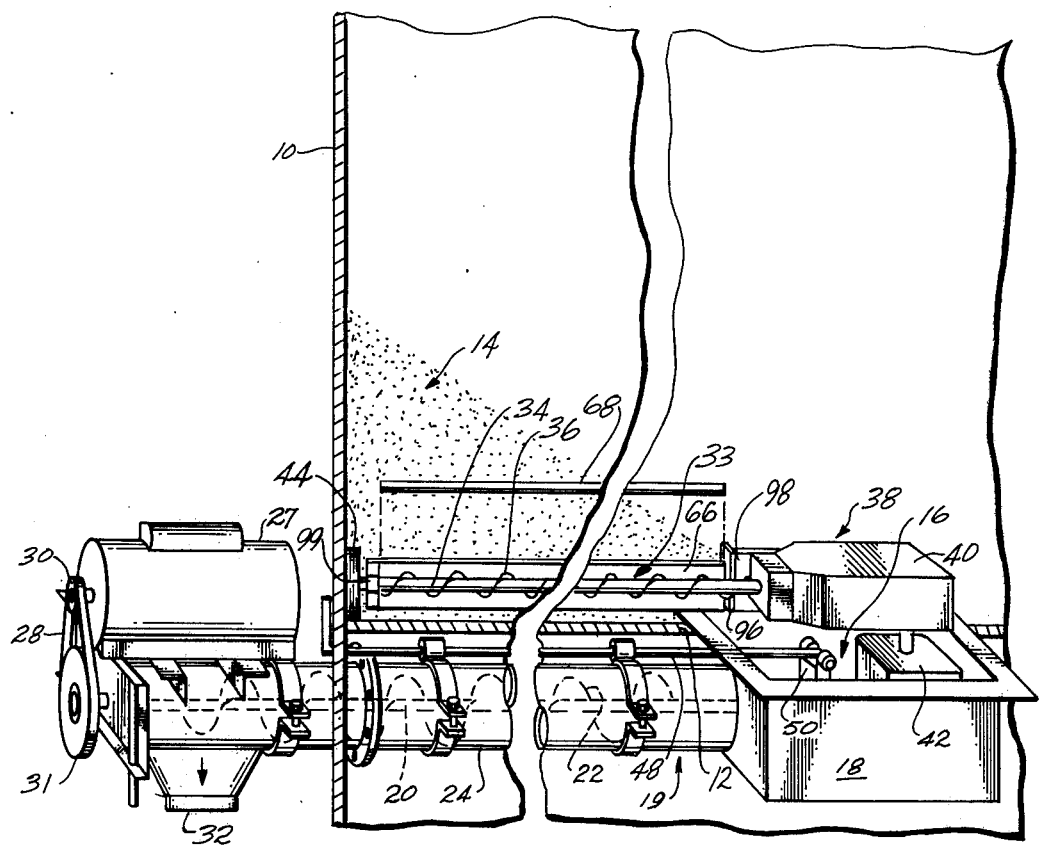
FIG. 1 is an exploded fragmentary perspective view, partly in section, showing a grain storage bin which includes a sweep auger and stiffening member according to this invention.

Referring to FIG. 1, a generally cylindrical, upright storage bin 10 includes a horizontally disposed floor 12 for holding a load of grain 14. The grain is unloaded through a discharge opening 16 in a sump or well 18 located in the center of the bin floor.

Grain is pulled through the discharge opening 16 and conveyed to the outside of the bin by an unloading auger 19 which comprises a horizontally disposed shaft 20 and a screw 22 attached to the shaft 20. The unloading auger is mounted in a horizontal discharge pipe or sleeve 24 located under the bin floor 12 and extending from the sump 18 to a point outside the bin 10. The power unit for rotating the unloading auger includes a motor 27 mounted outside the bin on an exterior extension of sleeve 24. A belt 28 driven by a drive pulley 30 of the motor engages a driven pulley 31 which is coupled to the unloading auger shaft 20. During use, the motor 27 rotates the unloading auger shaft 20 about its axis to pull grain in the storage bin toward the center discharge opening 16, and then through the discharge sleeve 24, and out through a discharge opening 32 of the sleeve located outside the bin where the grain is collected. Alternately, several spaced apart intermediate discharge openings or wells (not shown) can be located along the length of the unloading auger sleeve 24.

After all the grain that will flow naturally from the bin flows through the central discharge opening 16, the grain remaining in the bin extends upwardly at an angle from the center discharge opening toward the bin wall in all directions from the center, as represented schematically in FIG. 1. The remaining grain is removed by a sweep auger 33 which includes a rigid, elongated rotary shaft 34 having a screw 36 attached to it. The sweep auger extends radially outwardly in a horizontal direction from the vicinity of the discharge opening 16 toward the inner periphery of the storage bin wall. In storage bins of larger diameter, say more than 30 feet, a two-piece sweep auger is used. The ends of the two augers are connected to a bearing (not shown) located mid-span.

In the sweep auger shown in FIG. 1, the inner end of the shaft 34 is attached to a central drive unit 38 which includes a gear box 40 disposed above and rotatable relative to a fixed gear box 42. The motor 27 outside the bin provides the power for rotating the sweep auger as well as the unloading auger. The sweep auger 33 is left in the bin at all times. The outer end of the sweep auger shaft 34 having a roller 44 which rests on the storage bin floor. A clutch rod 48 extends under the bin floor to the outside of the bin.

When using the sweep auger to unload the grain remaining in the bin, the clutch rod 48 is operated to engage a clutch 50 located in the sump 18 in front of the lower gear box 42. This rotates the sweep auger via the power supplied by drive motor 27. The sweep auger will then travel around the bin to channel the grain toward the central discharge opening 16 for removal by the unloading auger 19.

FIG. 2 shows an alternate type of drive unit 52 in which the sweep auger 33 is connected to the drive unit only after the initial grain which will flow naturally has been removed. The drive unit 52 includes a drive motor (not shown) attached to the top of a motor mount 54 located in the central discharge opening of the bin. The sweep auger shaft 34 is attached to the drive unit 52 by mounting the inner end of the auger shaft 34 in bearings 56 on opposite sides of the motor mount 54. The bearings are held in place by bearing retainers 58. A driven pulley 60 is secured to the end of the auger shaft 34 by a drive pin 62. The pulley 60 is driven by a belt 64 engaged with a drive pulley (not shown) on the output shaft of the drive motor (not shown) to rotate the sweep auger shaft 34 about its axis.

The sweep augers shown in either FIG. 1 or FIG. 2 can be used with an elongated grain-deflecting shield 66 which is attached in a fixed position alongside the sweep auger 33. The shield extends parallel to and is continuous along substantially the entire length of the sweep auger. For example, in a 14-foot bin, the sweep auger is 7 feet long and the shield is 6 feet 4 inches long. In a 36-foot bin, the sweep auger is 17 feet 6 inches long and the shield is 16 feet 10 inches long. The shield has a generally concave face which faces toward the auger so as to conform to the generally curved contour of the auger. The concave face of the shield is spaced closely, say about 1 inch, from the auger from end-to-end of the shield.

The sweep auger 33 and shield 66 are reinforced by a fixed elongated stiffening member, hereafter called a torsion arm or torsion tube 68, which is attached alongside the shield on the side thereof remote from the sweep auger's direction of angular travel around the bin. The torsion arm extends parallel to the shield and is continuous along substantially the entire length of the shield. For example, in a 14-foot bin the torque arm is 6 feet 4 inches long, and in a 36-foot bin the torque arm is 16 feet 10 inches long. Preferably, the torque arm is held so that its axis is aligned generally along the center of the shield. The torque arm also is attached so it is closely spaced from the shield, the axis of the torque arm being about 1½ inches from the adjacent surface of the shield.

The ends of the torque arm 68 and shield 66 are rigidly attached together and both are rigidly held in fixed positions relative to opposite ends of the sweep auger 33. The torque arm 68 is a rigid piece which adds good longitudinal stiffness to the sweep auger and the shield, as well as stiffening the shield torsionally. Although the torque arm could be a solid piece, it is preferred to use a torque arm in the form of a rigid, elongated tube because it can provide the same amount of stiffness as a solid piece with less weight per unit of length. The preferred torque tube is a 1-inch O.D. 14 gauge steel tube of uniform O.D. and wall thickness from end to end. The size, shape and weight of the torque arm can vary, although it is preferred to use a member of closed tubular cross-section having a length substantially equal to that of the shield 66 and auger 33. If a heavier auger is used for greater unloading capacity, then the wall thickness or the outside diameter of the torque tube can be increased to a size necessary to obtain the desired longitudinal stiffness and torsional stiffness for the shield with the minimum weight per foot.

FIGS. 2, 3 and 4 show the preferred means for attaching the ends of the torque tube 68 and the shield 66 alongside the sweep auger 33 when the sweep auger is used with the drive unit 52 shown in FIG. 2. Separate pairs of tube clamps 70 hold opposite ends of the torque tube 68 in a fixed position relative to the shield 66 and attach the torque tube and shield as a unit in a fixed position alongside the sweep auger 33. Each pair of tube clamps 70 are movable independently of each other and each clamp includes a rounded portion 72 which fits around the circumference of the torque tube 68, and a tapered portion 74 which is angled to conform to the angled surface of the shield 66. The tube clamps also include aligned holes 76 and 78 on opposite sides of the rounded portion 72 for receiving respective fasteners (not shown) for rigidly clamping the rounded portions 72 around opposite sides of the torque tube 68 to hold the ends of the torque tube so the tube is non-rotatable about its axis. The tapered portions of the tube clamps include elongated slotted holes 80 for receiving respective fasteners (not shown) which extend through holes 82 in the shield when rigidly attaching the shield and torque tube in a fixed position alongside the sweep auger. The outer ends of the torque tube and shield are rigidly attached to a bearing bracket 84 carried on a hanger bearing 86 at the outer end of the sweep auger shaft 34. The sweep auger shaft rotates on its axis relative to the hanger bearing 86. The outer ends of the torque tube and shield are attached to the bearing bracket 84 by only two fasteners (not shown) which extend through the holes 80 of the tube clamps, through holes 82 in the shield, and then through holes 88 on the top and bottom of the bearing bracket 84.

The inner ends of the torque tube 68 and shield 66 are rigidly attached to a shield support bracket 90 (shown in flat unfolded form in FIG. 4) which is releasably, but rigidly, attached to the side of the motor mount 54. The torque tube and shield are attached to the shield support bracket 90 by only two fasteners (not shown) which extend through the slotted holes 80 of the tube clamps, through the holes 82 in the inner end of the shield, and then through corresponding holes 92 in the top and bottom of the bracket 90.

The shield 66 is easily adjustable in vertical elevation above the floor of the bin. Adjustment of the shield above the floor actually can be done in three separate places. The most convenient place to adjust the height of the shield is at its end next to the bin wall, by loosening the fasteners extending through holes 76 and 78 of the tube clamp on opposite sides of the torque tube. This frees the torque tube for vertical movement and allows the tube and shield to be rotated up or down to the desired elevation, after which the fasteners are tightened. This means for adjusting the elevation of the shield also can be accomplished by loosening the fasteners in the tube clamps at the inner end of the torque tube and shield and rotating the tube and shield. However, it would be physically more difficult for one person to make such an adjustment. The preferred means for adjusting the vertical elevation at the inner end of the shield is by adjusting the position of the shield support bracket 90 relative to the motor mount 54. The attachment of the shield support bracket 90 to the motor mount is adjustable both horizontally and vertically because of the horizontally extending slotted openings 94 in the bracket and the corresponding vertically extending slotted openings 96 in the side wall of the motor mount. As an alternative, the shield support bracket can be welded to the side of the motor mount with any adjustments in vertical elevation, if any, being made relative to the welded support bracket.

Similar means can be used to attach the shield and stiffening member in FIG. 1 alongside the sweep auger. The inner end of the shield is attached to a pivot bracket 96 which, in turn, is attached to a shield mounting bracket 98 affixed to the side of the gear box 40. The outer end of the shield is attached to an outer hanger bearing 99 in much the same way as that described for FIGS. 2 through 4 above.

Thus, the present invention provides a torque tube 68 which stiffens the sweep auger to minimize sagging in the center under its own weight. The torque tube also stiffens the shield longitudinally to minimize sagging as well as stiffening the shield torsionally to improve its resistance to twisting about its axis.

I claim:

1. In a grain storage bin having a floor with a central grain discharge opening in it, apparatus for unloading grain from the bin comprising:
   an elongated sweep auger located in the bin and extending radially from the vicinity of the discharge opening to the outer wall of the bin;
   means for rotating the sweep auger about its longitudinal axis and for permitting angular travel of the auger around the interior of the storage bin to pull grain toward the discharge opening;
   an elongated grain-deflecting shield extending generally parallel to the auger along substantially the entire length thereof;
   means for attaching the shield in a fixed position spaced closely from the auger on the side thereof remote from the direction of angular travel of the auger, the shield being mounted so that a generally concavely curved face of the shield faces toward the auger so the shield cooperates with the auger during use to channel grain toward the discharge opening during axial rotation of the auger, said shield attachment means including a pair of rigid support bracket means spaced apart along the length of the auger;
   a rigid, elongated stiffening member extending along a side of the shield opposite the auger;
   means for attaching the stiffening member in a fixed position spaced closely from the shield along a substantial portion of the length thereof to stiffen the shield longitudinally and torsionally and to stiffen the auger longitudinally, said stiffening member attachment means including a pair of rigid support bracket means for rigidly affixing the opposite end portions of the stiffening member in said fixed position and for engaging the opposite end portions of the shield, and means for rigidly attaching the stiffening member support bracket means and the opposite end portions of the shield to the shield support bracket means; and
   means for releasably attaching the stiffening member and the shield to the shield support bracket means to permit adjusting the vertical elevation of the shield and stiffening member above the bin floor relative to the position of the sweep auger.

2. Apparatus according to claim 1 in which the stiffening member is of tubular cross-section.

3. Apparatus according to claim 1 including a fixed auger drive unit housing mounted adjacent the discharge opening; and means for rigidly attaching an innermost one of said shield support bracket means to the housing.

4. Apparatus according to claim 3 including bearing means carried on the end of the auger remote from the housing; and means for rigidly attaching an outermost one of said shield support bracket means to the bearing means.

5. In a grain storage bin having a floor with a central grain discharge opening in it, apparatus for unloading grain from the bin comprising;
   an elongated sweep auger located in the bin and extending radially from the vicinity of the discharge opening to the outer wall of the bin;
   means for rotating the sweep auger about its longitudinal axis and for permitting angular travel of the auger around the interior of the storage bin to pull grain toward the discharge opening;
   an elongated grain-deflecting shield extending generally parallel to the auger for cooperating with the auger during use to channel grain toward the discharge opening during axial rotation of the auger;
   a rigid elongated stiffening member extending adjacent the shield along a substantial portion of the length thereof;
   means for attaching the stiffening member in a position spaced closely from the shield to provide torsional and longitudinal reinforcement for the shield, said attaching means including support bracket means for rigidly affixing the opposite end portions of the stiffening member to maintain the stiffening member non-rotatable about its axis and for rigidly affixing the stiffening member to opposite end portions of the shield to maintain the stiffening member in a fixed position relative to the shield;
   means for attaching the shield and attached stiffening member in a fixed position adjacent the auger so the shield is spaced from the auger on the side thereof remote from the direction of angular travel of the auger and the stiffening member is located on the opposite side of the shield from the auger so the stiffened shield will provide longitudinal reinforcement for the auger; and
   means for adjusting the vertical elevation of the shield and attached stiffening member above the bin floor relative to the position of the sweep auger.

6. Apparatus according to claim 5 in which the stiffening member is of tubular cross-section.

7. Apparatus according to claim 5 including fixed support means adjacent opposite end portions of the auger, the auger being rotatable relative to the fixed support means; and means for affixing opposite end portions of the shield and stiffening member to the fixed support means.

8. Apparatus according to claim 7 including means for attaching said support bracket means, together with opposite end portions of the shield, to the fixed support means.

9. In a grain storage bin having a floor with a central grain discharge opening in it, apparatus for unloading grain from the bin comprising:
   an elongated sweep auger located in the bin and extending radially from the vicinity of the discharge opening to the outer wall of the bin;
   means for rotating the sweep auger about its longitudinal axis and for permitting angular travel of the auger around the interior of the storage bin to pull grain toward the discharge opening;
   an elongated grain-deflecting shield extending generally parallel to the auger for cooperating with the auger during use to channel grain toward the discharge opening during axial rotation of the auger;
   a rigid elongated stiffening member extending adjacent the shield along a substantial portion of the length thereof;

first securing means for attaching the stiffening member in a position spaced closely from the shield to provide torsional and longitudinal reinforcement for the shield, said first securing means including support bracket means for rigidly affixing the opposite end portions of the stiffening member to maintain the stiffening member non-rotatable about its axis and for rigidly affixing the stiffening member to opposite end portions of the shield to maintain the stiffening member in a fixed position relative to the shield;

fixed support means adjacent opposite end portions of the auger, the auger being rotatable relative to the fixed support means; and second securing means for affixing opposite end portions of the shield and stiffening member to the fixed support means for maintaining the shield and attached stiffening member in a fixed position adjacent the auger so the shield is spaced from the auger on the side thereof remote from the direction of angular travel of the auger and the stiffening member is located on the opposite side of the shield from the auger so the stiffened shield will provide longitudinal reinforcement for the auger, said second securing means including means for attaching said support bracket means and opposite end portions of the shield to the fixed support means, and means for releasably attaching the stiffening member and the shield to the fixed support means to permit adjusting the vertical elevation of the shield and stiffening member above the bin floor relative to the position of the sweep auger.

10. In a grain storage bin having an outer wall and a floor within the confines of the outer wall, the floor having a central grain discharge opening in it, apparatus for unloading grain from the bin comprising:

an elongated sweep auger located in the bin and extending radially from the vicinity of the discharge opening to the outer wall of the bin, the auger having an inner end and an outer end;

means for rotating the auger about its longitudinal axis and for permitting angular travel of the auger around the interior of the storage bin;

means for supporting the auger above the floor of the bin;

an elongated grain-deflecting shield extending in a fixed position spaced closely from and extending generally parallel to the auger on a side of the auger remote from its direction of angular travel, the shield cooperating with the auger to channel grain toward the discharge opening during axial rotation of the auger;

means for supporting the shield in said fixed position independently of the bin floor and wall, the shield support means comprising first support means at said inner end of the auger, second support means carried on the outer end of the auger, the auger being rotatable relative to the first and second support means, and means for securing inner and outer end portions of the shield to the first and second support means, respectively;

a rigid elongated stiffening member disposed in a fixed position closely spaced from the shield and extending along a substantial portion of the length thereof; and means for attaching the stiffening member in said fixed position independently of the bin floor and wall to provide torsional and longitudinal reinforcement for the shield and longitudinal reinforcement for the auger, said attaching means comprising first and second support bracket means, and means for rigidly attaching the first and second bracket means to inner and outer end portions of the stiffening member, respectively, to maintain the stiffening member non-rotatable about its axis relative to the bracket means, and means for rigidly affixing the first and second bracket means to the first and second shield support means to maintain the stiffening member in a fixed position relative to the shield and the auger.

11. Apparatus according to claim 10 in which the stiffening member is of tubular cross-section.

12. Apparatus according to claim 10 including means for adjusting the vertical elevation of the shield and attached stiffening member above the bin floor relative to the position of the sweep auger.

* * * * *